July 1, 1930.  R. G. BRAY  1,769,202
VALVE MECHANISM
Filed Aug. 23, 1929  3 Sheets-Sheet 1
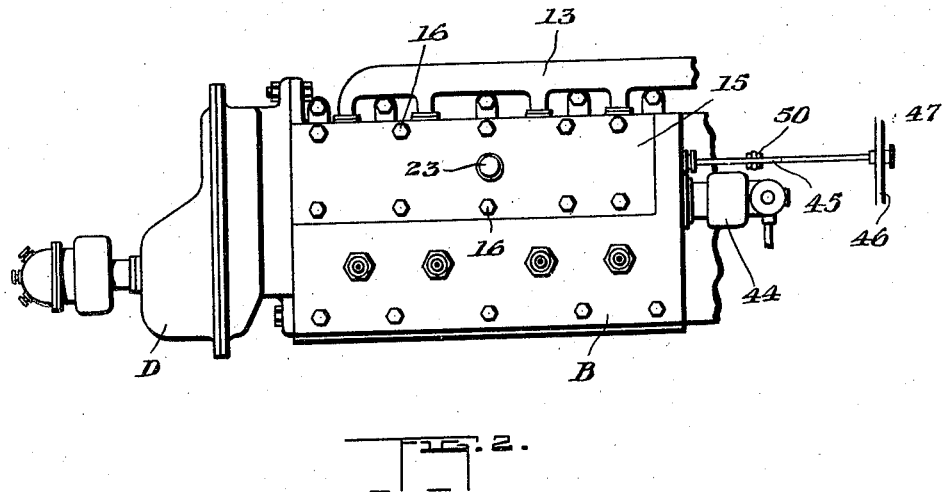
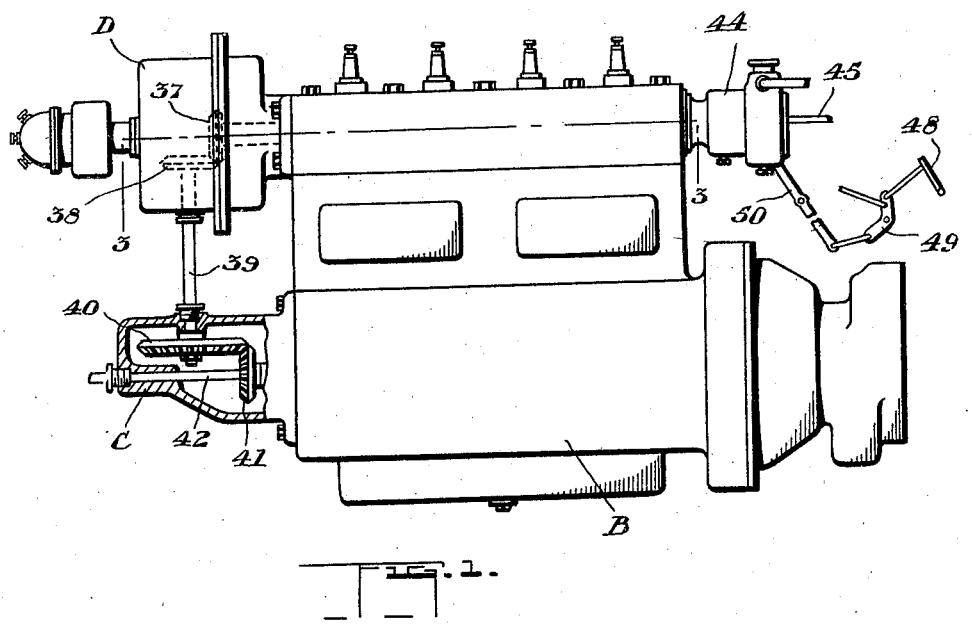
REGINALD G. BRAY,
INVENTOR.
BY Fetherstonhaugh & Co.
ATTY'S.

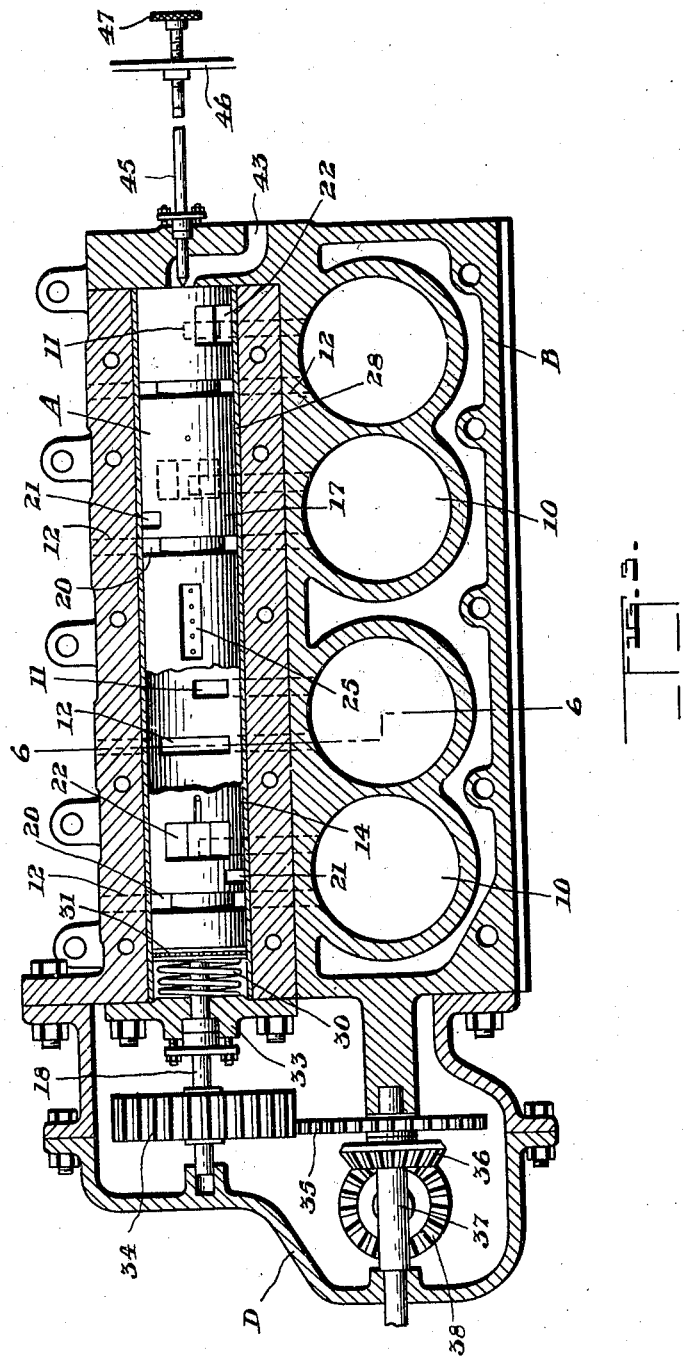

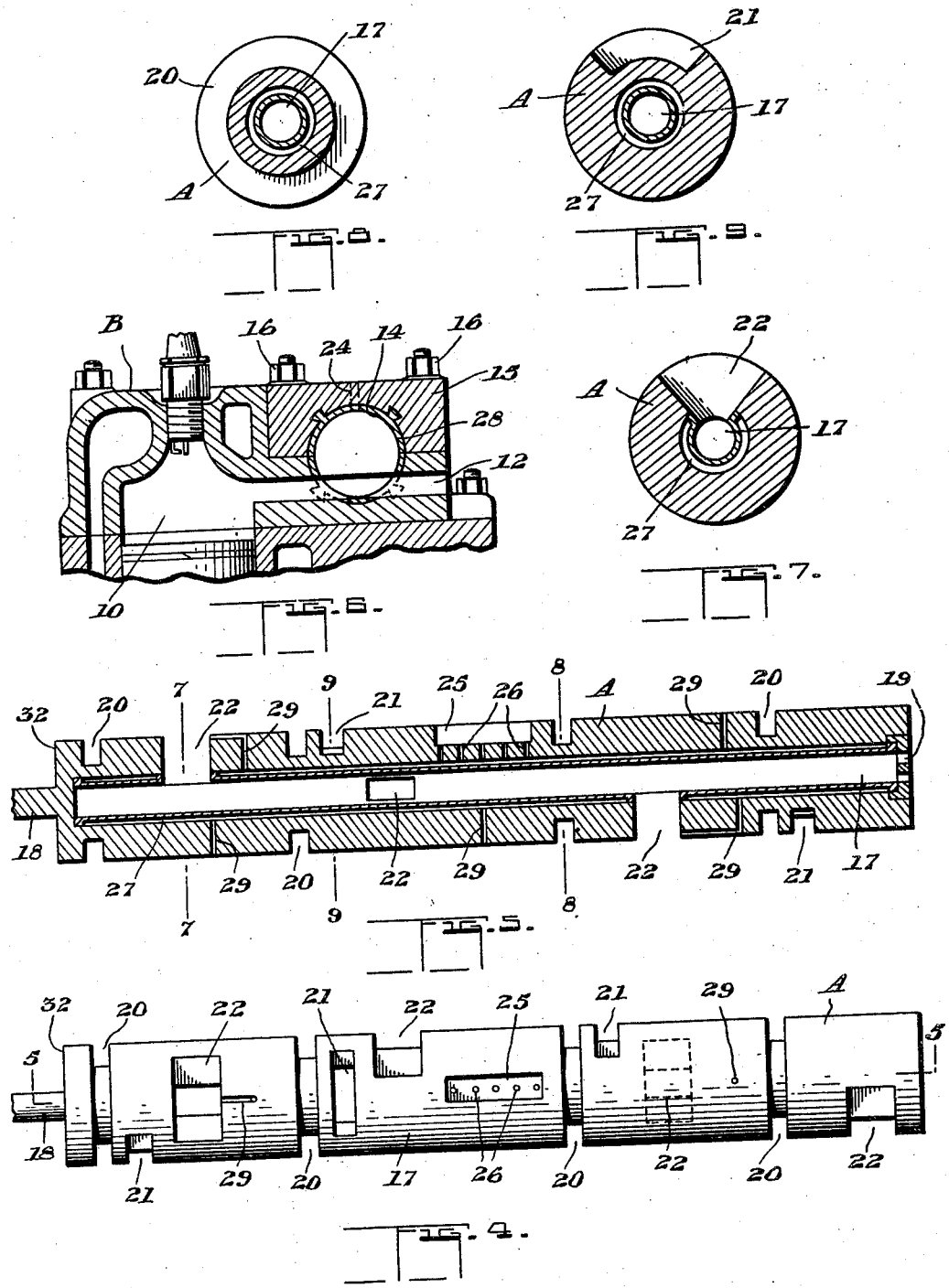

Patented July 1, 1930

1,769,202

UNITED STATES PATENT OFFICE

REGINALD GILBERT BRAY, OF SHAWINIGAN FALLS, QUEBEC, CANADA

VALVE MECHANISM

Application filed August 23, 1929. Serial No. 388,013.

This invention relates to improvements in valve mechanisms and particularly that type of valve associated with internal combustion engines and one of the objects of the invention is to provide a device which will reduce fuel consumption and more effectively perform the functions required of it.

Another object of the present invention is to provide valve mechanism which may be operated in conjunction with the operation of the motor vehicle and according to driving conditions may be readily adjusted for fuel saving.

A further object of the invention is to provide valve means which enable the engine to operate with fewer moving parts and which lends greater flexibility to driving.

A still further object of the invention is to provide improved valve mechanism which will make coasting or free running more practical and eliminate the necessity of declutching etc. all of which tend to make this type of driving hazardous.

Yet a further object of the invention is to provide valve mechanism which may be employed for interior cylinder cooling. The valves being suitably arranged and so synchronized as to permit cylinder air breathing intermittent of the power strokes, thus modifying or eliminating the present engine air cooling system and reducing the weight in pounds per horse power.

As the description of the device proceeds the novelty and general utility of the invention will become apparent. The invention itself consists in the combination and arrangement of parts hereinafter described in detail and illustrated in the accompanying drawings in which, Figure 1 is a side view of an internal combustion engine fitted with my improved valve mechanism and illustrating means for the operation thereof.

Figure 2 is a plan view of Figure 1.

Figure 3 is a section taken on the line 3—3 of Figure 1.

Figure 4 is an enlarged plan view of the valve as detached.

Figure 5 is a longitudinal section taken on the line 5—5 of Figure 4.

Figure 6 is a section taken on the line 6—6 of Figure 3.

Figure 7 is an enlarged transverse section taken on the line 7—7 of Figure 5.

Figure 8 is an enlarged transverse section taken on the line 8—8 of Figure 5.

Figure 9 is an enlarged transverse section taken on the line 9—9 of Figure 5.

In referring to the accompanying drawings in which like characters of reference indicate corresponding parts throughout the several views the letter A designates the valve mechanism as a whole rotatably mounted in the internal combustion engine B. The driving mechanism for the valve being arranged within the housings C and D respectively.

The valve itself is of the rotary type and is mounted in the cylinder head adjacent to and parallel with the combustion chambers or cylinders 10 and forms a communicating control for the cylinders. Each of the cylinders or combustion chambers are provided with an inlet port 11 and an exhaust port 12 and at predetermined periods of operation the inlet ports of the valve A communicate with the inlet ports 11 while the exhaust ports communicate with the valve, the cylinders and the exhaust manifold 13.

For purposes of mounting and convenience etc., the valve housing which includes the seat 14 is formed with a detachable member 15 which is secured in position by means of bolts or the like 16 while the lower portion of the seat is formed in the cylinder head proper.

Referring now to the valve A which forms an essential feature of the invention this comprises a hollow longitudinal tubular member 17, closed at one end and formed with an extended portion 18 in the form of a shaft and open at the opposite end as indicated at 19 for the admittance of a combustible fuel.

Arranged in spaced relationship in the valve body I provide a series of annular grooves 20 which will for purposes of distinction be referred to as exhaust channels or ports. Adjacent these channels and in spaced relation thereto I provide a further series of exhaust channels or ports 21 which will hereinafter be referred to as exhaust compression ports, these latter ports it will be noted are arcuate in formation and embrace only a small portion of the periphery of the valve body. Adjacent the exhaust compression ports and in spaced staggered relation are the fuel inlet ports 22. These ports as indicated in Figure 3 are comparatively wide and communicate directly with the interior of the hollow valve 17, as shown in Figure 7.

Lubricating means for the valve comprise an oil cup or the like 23 mounted in the head 15 and which communicates by way of the channel 24 with the reservoir 25 formed in the valve A. The reservoir, through a series of passageways 26, communicates with an annular reservoir 27 formed within the hollow chamber 17 and which distributes the lubricant to the valve seat and bearing lining 28 by way of the passageways 29.

For purposes which will be hereinafter more fully related the valve A is movable axially within the seat 14 so as to change the relative positions of the exhaust channels and the exhaust compression channels.

The means which I provide to enable this axial movement of the valve to be effected comprises a coil spring 30 encircling the shaft 18. The spring is held between the thrust bearing 31 which butts the shoulder 32 of the valve and the collar or fitting 33, the thrust bearing permitting the free and easy rotation of the valve when in operation.

The means which I have illustrated for rotating the valve A comprises the comparatively wide gear 34 mounted on the shaft 18 and having meshed therewith the gear 35. The gear 35 and a bevel gear 36 are both mounted on the shaft 37. Meshing with the gear 36 is a further bevel gear 38 which is mounted on the vertical shaft 39. This vertical shaft extends into the housing C and at its lower end is provided with a further bevel gear 40 meshing in turn with the bevel gear 41 which is mounted on the crank shaft 42 from which source the valve is rotated.

As a means for introducing a combustible fuel through the hollow valve into the cylinders 10 I provide an inlet passageway 43 which is formed in the cylinder head and which communicates with the open end 19 of the valve A. In the present instance I indicate the fuel control means in the form of a carburetor 44 which may be attached directly to the introduction end of the inlet 43. The carburetor may be of any well known type and is controlled through the operation of a foot accelerator.

The means which I employ to move the valve axially may be of any suitable type arranged in any convenient manner or operative position, for instance the operating plunger 45 may be connected to the accelerator or associated with the steering wheel or on the other hand it may be mounted on the instrument board or connected to the brake pedal, as a matter of fact all these means could be employed and each one operated independent of the other according to convenience.

In one of the present illustrations (see Figure 3) I have indicated the rod or plunger 45, which would be centered on the spider in the open end 19 of the valve, as being operated from the instrument board 46 by a knurled nut 47 secured to a threaded rod. The member 45 would preferably be formed in an independent section so that the operation of one mechanism would not interfere with the other.

In Figure 1 particularly I illustrate the valve control as being operated in conjunction with the accelerator 48 which is connected through the bell crank lever 49 and pivotal lever 50 with the plunger 45.

In operation and assuming that the engine is dead the channels 20 of the exhaust would be in register with the exhaust ports 12 and the inlet ports 22 would be in register with the intake ports 11. In this position no vacuum or compression can take place in the cylinders. Now assume that the engine is to be started, the plunger 45 is operated to move the valve A axially in a forward direction so as to bring the exhaust compression ports 21 into register with the exhaust ports 12, at the same time the wide fuel inlet ports 22 remain in register with the fuel inlets 11 and the comparatively wide gear 34 slides to a forward position and remains in mesh with the gear 35. The engine is now ready for starting and running under ordinary traffic conditions.

For purposes of further explanation as to the operation of my device assume now that the vehicle has been under operation and has moved out of congested traffic and a long hill or other coasting conditions present themselves. The driver of the vehicle immediately releases the member 45 when the pressure of the spring 30 will cause the valve A to move rearward to its normal original position and the channels 20 will again be in register with the exhaust ports 12. This latter operation as previously explained will eliminate vacuum and compression and permit the free running of the engine without the necessity of de-clutching and at the same time effect the economical operation of the engine with regard to fuel consumption.

In the foregoing it will be noted that I employ a novel means of introducing and regulating the fuel supply to the combustion chambers and a practical means for coasting and effecting the silent operation of the motor with the added advantage of reducing the fuel consumption.

It is to be understood that the present invention is not limited to the precise construction set forth but that it includes within its purview whatever changes fairly come within either the terms or the spirit of the appended claims.

What I claim as my invention is:

1. Valve mechanism for internal combustion engines comprising in combination with an engine of this type of an axially movable hollow rotary valve, drive mechanism for rotating the valve, a triple series of channels and ports in the valve adapted for communication of fuel and spent gases to and from the engine and operating mechanism for effecting the axial movement of the valve.

2. Valve mechanism for internal combustion engines comprising a hollow axially movable rotary valve provided with an open communicative end and a series of arcuate ports communicating with the interior and exterior of the valve, a series of annular channels in the valve body, a series of arcuate channels or ports adjacent the annular channels and a lubricating reservoir formed within the hollow interior of the valve.

3. Valve mechanism for internal combustion engines comprising in combination with an engine formed with combustion chambers and inlet and exhaust ports of a hollow axially movable rotary valve formed with an open communicative end and a single series of fuel intake ports, a double series of exhaust channels formed in the valve body, drive mechanism for rotating the valve and operative mechanism for effecting the axial movement of the valve as a whole to change the relative positions of the double exhaust channels with respect to the first mentioned exhaust ports.

4. Valve mechanism of the character described comprising in combination with an internal combustion engine provided with combustion chambers and inlet and outlet ports of a hollow rotatable valve body axially movable formed with an open communicative end and fuel inlet ports, a series of annular exhaust channels formed in the valve normally adapted to register with the exhaust ports of the combustion chambers and prevent compression and vacuum in said chambers, a series of arcuate exhaust channels formed in the valve adapted to permit compression and vacuum in the combustion chambers, operative mechanism for effecting the axial movement of the valve to change the relative position of the exhaust channels, lubricating means for the valve and a controlled device for supplying fuel to the open end of the valve for distribution to the combustion chambers.

5. A valve as set forth in claim 4 in which the lubricating means for the valve comprise an exteriorly formed reservoir communicating with an interiorly formed reservoir from which lubricant is distributed.

6. A valve as set forth in claim 4 in which the axial movement of the valve body alters the relative positions of the exhaust channels without altering the communicative relationship of the fuel inlet ports.

7. Valve mechanism for internal combustion engines comprising in combination with an engine of this type of an axially movable hollow rotary valve, drive mechanism for rotating the valve, a multiple series of channels and ports in the valve adapted for communication of fuel and spent gases to and from the engine and operating mechanism for effecting the axial movement of the valve.

In witness whereof I have hereunto set my hand.

REGINALD GILBERT BRAY.